United States Patent [19]

Bradley et al.

[11] Patent Number: 4,524,163
[45] Date of Patent: Jun. 18, 1985

[54] CEMENTIFEROUS COMPOSITIONS

[75] Inventors: Geoffrey Bradley, Oberiamstadt, Fed. Rep. of Germany; John T. Hoarty; Ian M. Howarth, both of Cheshire, England

[73] Assignee: Internationale Octrooi Maatschappij "Octropa" B.V., London, England

[21] Appl. No.: 619,209

[22] Filed: Jun. 11, 1984

[30] Foreign Application Priority Data

Jun. 21, 1983 [GB] United Kingdom ............... 8316819

[51] Int. Cl.³ .................. C04B 7/35; C04B 13/24; C08K 5/05; C08L 33/02
[52] U.S. Cl. ............................... 524/5; 106/90; 524/249; 524/419
[58] Field of Search ............ 106/90; 524/5, 249, 524/419

[56] References Cited

U.S. PATENT DOCUMENTS

| 4,222,920 | 9/1980 | Crisp et al. | 524/5 |
| 4,229,224 | 10/1980 | Dawson et al. | 524/5 |
| 4,243,762 | 1/1981 | McClain | 524/249 |
| 4,249,950 | 2/1981 | Hurst | 106/90 |
| 4,298,392 | 11/1981 | Isselmann | 106/315 |
| 4,373,956 | 2/1983 | Rosskopf | 106/90 |
| 4,398,957 | 8/1983 | Ceska et al. | 106/90 |
| 4,405,372 | 9/1983 | Serafin et al. | 106/90 |
| 4,419,138 | 12/1983 | Popovics | 106/90 |

FOREIGN PATENT DOCUMENTS 0097513  4/1984  European Pat. Off.

Primary Examiner—Ronald W. Griffin
Attorney, Agent, or Firm—Cushman, Darby & Cushman

[57] ABSTRACT

This invention provides plasticizer additive compositions, for use in cementiferous compositions, which enhance the early gain of compressive strength. The plasticizer additive compositions comprise an aqueous solution of a copolymer or salt thereof, comprising an ethylenically unsaturated monomer having a hydroxyl functional group and an accelerator additive.

6 Claims, No Drawings

CEMENTIFEROUS COMPOSITIONS

This invention relates to cementiferous compositions and to additives for use in such compositions, which additives improve the physical characteristics of the cementiferous compositions for various purposes such as enhancement of flow and workability, acceleration of early strength gain and reduced water content.

The cementiferous compositions with which this invention is concerned include concretes which comprises cement, coarse and fine aggregates and water; cement pastes which comprise cement and water, and mortars which comprise cement, sand and water; lime, sand and water, or mixtures containing both lime and cement. The invention is also applicable to steam-cured concretes comprising cement, aggregate and water; lime or limestone and siliceous materials such as silica flour and water.

In co-pending European Patent Application No. 0 097 513 plasticisers for concrete have been claimed which comprise copolymers of an ethylenically polymerisable carboxylic acid and a hydroxy alkyl ester of an ethylenically polymerisable carboxylic acid. These compositions are excellent plasticisers for concrete, but in applications where an early gain of compressive strength is desirable these compositions are not wholly satisfactory.

A wide range of accelerators for concretes is known but their effectiveness varies widely. Some accelerators are known to have positive disadvantages in concrete compositions.

Known accelerators include calcium chloride, soluble formates, nitrates and nitrites and alkanolamines such as triethanolamine.

It has now been found that only two types of accelerator have generally beneficial properties when used with these copolymer additives.

Accordingly, the present invention provides a plasticiser additive composition comprising an aqueous solution of a copolymer, or soluble salt thereof, comprising an ethylenically polymerisable carboxylic acid and an ethylenically unsaturated monomer having a hydroxyl functional group which monomer is copolymerisable with said acid, the copolymer having a molecular weight in the range 1000 to 15000 and from 5 to 60% by weight of the copolymer of an accelerator additive selected from triethanolamine and salts thereof and water-soluble thiocyanates.

Suitable polymerisable acids include acrylic, methacrylic, crotonic, maleic, fumaric, itaconic, citraconic and/or aconitic acids and like ethylenically unsaturated acids. The preferred acids are acrylic, methacrylic and maleic acid with acrylic or methacrylic acids being most preferred.

Suitable ethylenically unsaturated monomers having a hydroxyl functional group include allyl alcohol, 2-methyl-allyl alcohol, 2-methyl-(1-butene-3-ol), hydroxy ethyl, hydroxy propyl and like esters of the above acids. In addition, hydroxy alkyl acrylamides such as n-methylol acrylamide and n-(2-hydroxy ethyl)acrylamide can also be used.

Preferably the mole percentage of the acrylic acid in the copolymer is in the range 60 to 85 mole %. Absolute molecular weight of the copolymers of this invention have not been determined. However, apparent molecular weights as calculated relative to polyethylene glycol standards have been determined, using gel permeation chromatography. The apparent molecular weight of the copolymer may be varied over a wide range, the preferred range being 1000 to 15000, more preferably 1000–9000.

Precise molecular weights have not been determined for all the copolymers used but in some cases viscosity determinations have been carried out. The preferred viscosity is less than 30 cps as a 15% by weight aqueous solution in 1 molar NaCl.

Accelerators useful in this invention include sodium potassium and ammonium thiocyanate and triethanolamine and salts thereof. The preferred accelerator is triethanolamine. The preferred proportion of these accelerators is 15 to 35% by weight of the copolymer.

The additives may also conveniently contain an antifoaming agent alternatively known as an air detraining agent. Suitable agents include tributyl phosphate, dibutyl phthalate, various water-insoluble alcohols and silicone derivatives and mixtures thereof.

In addition the additives may also contain known dispersants such as lignosulphanates, naphalene sulphonates and water-soluble melamine formaldehyde polymers.

Airentraining agents may also be added for specific uses.

Suitable copolymers may be made by the copolymerisation of the carboxylic acid and the monomer having the hydroxyl function using methods known in polymerisation technology. The resultant copolymer may be neutralised with a suitable base such as sodium hydroxide or other soluble base and diluted with water to the required concentration for use in the plasticiser additive provided by this invention.

Unless otherwise specified a uniform mixing procedure was adopted in all the examples quoted here.

The aggregate is placed in the mixer, approximately half the mixing water added and mixed for 30 seconds. The remaining water (containing the admixture) is added and mixed for a further 3 minutes.

The same materials were used throughout, ie:

20 mm Croxden gravel (rounded)
10 mm Croxden gravel (irregular/rounded)
Zone 4 Almington Pit Sand
Zone 3 Almington Pit Sand
Zone 1 Almington Pit Sand Classified according to British Standard 882.

Ordinary Portland Cement (OPC): Supplied by Blue
Sulphate resisting cement (SRC): Circle Ind. Ltd.
Pulverised fuel ash: Supplied by Pozzolanic Ltd.

Plastic density and compressive strength were determined according to BS 1881. Workability of flowing concrete was measured using the German DIN 1048 Flow Table method and the slump test (BS 1881).

Accelerating Additives

Using a copolymer as described in European Patent Specification No. 0 097 513 as the base constituent, various formulations were prepared using known accelerating additives.

Admixture A 27.0% Sodium salt of 2.5/1 molar (acrylic acid/hydroxypropyl acrylate (AA/HPA) copolymer
62.8% Water 0.2% TBP
10.0% Accelerating additive The formulations were evaluated in a concrete mix in comparison with a commercial polymeric naphthalene sulphonate (Admixture B) and the above formulation with no additive to determine the effect on early strength gain in the following mix design.

Admixture B

A 35% aqueous solution of a polymeric naphthalene sulphonate.

Mix Design

350 Kg $M^{-3}$ OPC (Ordinary Portland Cement)
780 Kg $M^{-3}$ 20 mm Croxden Gravel
330 Kg $M^{-3}$ 10 mm Croxden Gravel
80 Kg $M^{-3}$ Zone 1 Almington Pit Sand
660 Kg $M^{-3}$ Zone 3 Almington Pit Sand
water/cement = 0.66
aggregate/cement = 5.29
% fines = 40.0

Results are shown below in Table I.

TABLE I

| Admixture Formulation | Accelerating Additive | Admixture Dosage % bwc | Slump (mm) | Comp Str (N/mm²) 1 Day | % of Control Comp Str at 1 Day |
|---|---|---|---|---|---|
| Nil | Nil | Nil | 30 | 7.1 | 100 |
| A | Nil | 0.4 | 220 | 6.2 | 87 |
| A | Triethanolamine | 0.4 | 190 | 7.4 | 104 |
| A | Sodium thiocyanate | 0.4 | 180 | 7.3 | 103 |
| A | Calcium formate | 0.4 | 170 | 5.4 | 76 |
| A | Calcium chloride | 0.4 | 180 | 6.2 | 90 |
| A | Sodium nitrate | 0.4 | 180 | 6.2 | 87 |
| A | Calcium nitrate | 0.4 | 180 | 6.0 | 85 |
| B | Nil | 1.0 | 200 | 7.5 | 106 |

These results show triethanolamine (TEA) and sodium thiocyanate (NaSCN) to be successful additives in this formulation.

It is well known that accelerators such as calcium chloride are only effective at comparatively high dosage levels.

Formulations were prepared such that a fixed dosage of the Admixture (0.36% bwc) was added to a concrete mix, but a variable dosage of the accelerating additive could be added.

Mix Design

350 Kg $M^{-3}$ OPC
780 Kg $M^{-3}$ 20 mm Croxden Gravel
330 Kg $M^{-3}$ 10 mm Groxden Gravel
700 Kg $M^{-3}$ Zone 3 Almington Pit Sand
water/cement = 0.59

Admixture C

30% Na salt 2.5/1 molar AA/HPA copolymer
69.75% Water
0.25% TBP
Accelerating Additive Percentage (bwc) calculated as anhydrous salt.
Results are shown below in Table II.

TABLE II

| Admixture C Dosage % bwc | Accelerating Additive | Accelerating Additive % bwc | Slump (mm) | Flow (cms) | Compressive Strength (N/mm²) 1 day | 7 day | 28 day |
|---|---|---|---|---|---|---|---|
| Nil | Nil | Nil | 70 | — | 13.4 | 34.2 | 41.3 |
| 0.36 | Nil | Nil | — | 60 | 10.8 | 32.4 | 43.0 |
| 0.36 | TEA | 0.04 | — | 62 | 13.3 | 36.0 | 45.0 |
| 0.36 | Calcium Chloride | 1.0 | — | 54 | 14.6 | 31.0 | 44.5 |
| 0.36 | Calcium Nitrate | 1.0 | — | 59 | 12.3 | 35.3 | 43.0 |
| 0.36 | Sodium Nitrate | 1.0 | — | 60 | 12.1 | 30.3 | 40.8 |
| 0.36 | Calcium Formate | 1.0 | — | 56 | 11.3 | 32.0 | 41.0 |

Triethanolamine is shown—at a low dosage—to offset retardation characteristics of the polymer system. Calcium chloride, apart from the obvious limitations in relation to corrosion produces good early strength but has an adverse effect on plasticising performance.

The other accelerating additives shown here confer no significant advantages to the plasticiser component.

The triethanolamine (TEA) and NaSCN additives were re-evaluated in Admixture C to compare the rate of early strength gain.

Admixture 1

90% w/w Admixture C
10% w/w TEA

Admixture 2

90% w/w Admixture C
10% w/w NaSCN

The admixtures were compared in the following concrete mix design:

350 Kg $M^{-3}$ OPC (Ordinary Portland Cement)
800 Kg $M^{-3}$ 20 mm Croxden Gravel
350 Kg $M^{-3}$ 10 mm Croxden Gravel
120 Kg $M^{-3}$ Zone 1 Almington Pit Sand
580 Kg $M^{-3}$ Zone 4 Almington Pit Sand
water/cement = 0.69
aggregate/cement = 5.29
% fines = 37.8

Results are shown below in Table III.

TABLE III

| Admixture | Admixture Dose % bwc | Slump (mm) | Flow B (cm) | Plastic Density Kg/M³ | Comp Str (N/mm²) 1 day | % of Control Comp Str at 1 day |
|---|---|---|---|---|---|---|
| Nil | Nil | 65 | — | 2270 | 6.9 | 100 |
| C | 0.4 | — | 57 | 2280 | 6.0 | 87 |
| 1 | 0.4 | — | 52 | 2290 | 7.4 | 107 |
| 2 | 0.4 | — | 50 | 2280 | 6.9 | 100 |

At the additive levels used here both TEA and NaSCN affect the flow properties of the admixture compositions but retardation of 1 day compressive strength is shown to be eliminated.

Admixture 1 is shown to produce better 1 day compressive strength with less effect on plasticising properties than Admixture 2.

To further show the beneficial effect/specificity of TEA to this polymer system the effect of different alkanolamine types on the Admixture C composition are shown below:

90% Admixture C
10% Alkanolamine

Mix Design

350 Kg M$^{-3}$ OPC (Ordinary Portland Cement)
780 Kg M$^{-3}$ 20 mm Croxden Gravel
330 Kg M$^{-3}$ 10 mm Croxden Gravel
660 Kg M$^{-3}$ Zone 3 Almington Pit Sand
80 Kg M$^{-3}$ Zone 1 Almington Pit Sand
water/cement = 0.66
aggregate/cement = 5.29
% fines = 40.0

Results are shown below in Table IV.

TABLE IV

| Admixture Composition | Alkanolamine Additive | Admixture Dose (% bwc) | Slump (mm) | Comp Str (N/mm$^2$) 1 Day | % of Control Comp Str at 1 Day |
|---|---|---|---|---|---|
| Nil | Nil | Nil | 30 | 7.1 | 100 |
| C | Nil | 0.4 | 220 | 6.2 | 87 |
| C | Triethanolamine | 0.4 | 190 | 7.4 | 104 |
| C | Diethanolamine | 0.4 | 200 | 6.0 | 85 |
| C | Monoethanolamine | 0.4 | 190 | 5.6 | 79 |
| C | Tri-isopropanolamine | 0.4 | 200 | 6.2 | 87 |
| C | Amino ethyl ethanolamine | 0.4 | 200 | 6.6 | 93 |
| C | Tris-hydroxymethyl methylamine | 0.4 | 200 | 6.3 | 88 |
| C | Triethanolamine-acetate salt | 0.4 | 210 | 6.8 | 96 |
| C | Triethanolamine-formate salt | 0.4 | 200 | 6.7 | 94 |
| B | Nil | 1.0 | 200 | 7.5 | 106 |

Level of TEA

Various levels of TEA were incorporated into the plasticiser component to demonstrate the concentration dependence of the accelerating additives in a polymer composition.

Mix Design

350 Kg M$^{-3}$ OPC (Ordinary Portland Cement)
800 Kg M$^{-3}$ 20 mm Croxden Gravel
350 Kg M$^{-3}$ 10 mm Croxden Gravel
580 Kg M$^{-3}$ Zone 4 Almington Pit Sand
120 Kg M$^{-3}$ Zone 1 Almington Pit Sand
water/cement = 0.69
aggregate/cement = 5.29
% fines = 37.8

Results are shown below in Table V.

TABLE V

| Admixture Composition | | Total Admixture Dose % bwc | Slump (mm) | Flow B (cm) | Plastic Density Kg/M$^{-3}$ | Compressive Strength (N/mm$^2$) | | |
|---|---|---|---|---|---|---|---|---|
| | | | | | | 1 Day | 7 Day | 28 Day |
| Nil | | Nil | 70 | — | 2270 | 6.9 | 27.1 | 35.8 |
| C | | 0.4 | — | 57 | 2280 | 6.0 | 28.1 | 35.0 |
| % Admixture C | TEA | | | | | | | |
| 96 | 4 | 0.4 | — | 56 | 2290 | 6.7 | 29.3 | 35.8 |
| 94 | 6 | 0.4 | — | 56 | 2280 | 7.1 | 28.5 | 35.7 |
| 92 | 8 | 0.4 | — | 54 | 2280 | 7.1 | 28.7 | 36.3 |
| 90 | 10 | 0.4 | — | 52 | 2290 | 7.4 | 28.0 | 38.0 |
| B | | 1.0 | — | 58 | 2280 | 7.1 | 29.0 | 34.5 |

Admixtures with increasing triethanolamine concentration showed an improvement in 1 day compressive strength, but with a reduction in plasticising effect.

A level of 6% triethanolamine in the Admixture C composition was shown to produce the optimum effect with respect to both parameters.

To further demonstrate the effect of triethanolamine a further series of concrete mixes were performed using a 6% additive level in Admixture C.

Admixture D

94% w/w Admixture C
6% w/w triethanolamine

Mix Design

350 Kg/M$^{-3}$ OPC (Ordinary Portland Cement)
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
water/cement = 0.60
aggregate/cement = 5.17
% fines = 38.7

Results are shown in Table VI.

TABLE VI

| Admixture Composition | Admixture Dose % bwc | Slump (mm) | Flow A (cm) | Flow B (cm) | Compressive Strength (N/mm$^2$) | | |
|---|---|---|---|---|---|---|---|
| | | | | | 1 Day | 7 Day | 28 Day |
| Nil | Nil | 60 | 20 | — | 7.8 | 28.7 | 38.3 |
| C | 0.3 | — | 31 | 60 | 5.8 | 29.1 | 38.3 |
| C | 0.4 | — | 33 | 60 | 6.2 | 28.4 | 37.1 |
| C | 0.6 | — | 39 | 62 | 5.0 | 28.7 | 37.0 |
| D | 0.3 | — | 29 | 56 | 7.9 | 30.8 | 37.2 |
| D | 0.4 | — | 30 | 59 | 7.8 | 29.6 | 36.6 |
| D | 0.6 | — | 36 | 61 | 7.0 | 33.0 | 39.3 |

These results confirm the beneficial effect of triethanolamine addition to the composition over a range of admixture dosage levels.

A further copolymer was prepared comprising 2.5/1 mole AA/HPMA (acrylic acid/hydroxy propyl methacrylate—5.1 cps at 15% solids in 1M aqueous NaCl) and was formulated into the following compositions:

Admixture E

30% w/w 2.5/1 mole AA/HPMA copolymer as Na salt
69.75% w/w Water
0.25% w/w Tri-n-butyl phosphate

Admixture F

94% w/w Admixture E
6% w/w Triethanolamine

The beneficial effect of triethanolamine addition was demonstrated in the following concrete mix design:

Mix Design

350 Kg/M$^{-3}$ OPC
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
   water/cement=0.60
   aggregate/cement=5.17
   % fines=38.7

Results are shown in Table VII.

TABLE VII

| Admixture Composition | Admixture Dose % bwc | Slump (mm) | Flow A (cm) | Flow B (cm) | Compressive Strength (N/mm$^2$) 1 Day | 7 Day | 28 Day |
|---|---|---|---|---|---|---|---|
| Nil | Nil | 75 | 20 | — | 7.8 | 32.8 | 44.3 |
| E | 0.4 | — | 33 | 62 | 6.1 | 34.5 | 48.0 |
| F | 0.4 | — | 34 | 62 | 9.6 | 36.5 | 48.5 |
| B | 1.0 | — | 35 | 62 | 6.6 | 36.0 | 48.0 |

These results show that a 6% addition of triethanolamine to Admixture E significantly improves the early compressive strength development without affecting plasticising performance.

Two preferred compositions of the invention were compared at various dosage levels with a commercial polymeric naphthalene sulphonate (Admixture B) in the following mix design:

350 Kg/M$^{-3}$ OPC
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
   water/cement=0.60
   aggregate/cement=5.17
   % fines=38.7

Results are shown in Table VIII.

TABLE VIII

| Admixture Composition | Admixture Dose (% bwc) | Slump (mm) | Flow A (cm) | Flow B (cm) | Compressive Strength (N/mm$^2$) 1 Day | 7 Day | 28 Day |
|---|---|---|---|---|---|---|---|
| Nil | Nil | 75 | 22 | — | 7.8 | 32.8 | 46.3 |
| D | 0.2 | — | 26 | 58 | 9.0 | 35.3 | 48.8 |
| D | 0.4 | — | 33 | 59 | 8.8 | 37.5 | 49.0 |
| D | 0.6 | — | 41 | 64 | 8.3 | 40.0 | 50.0 |
| F | 0.2 | — | 31 | 59 | 8.8 | 32.5 | 47.0 |
| F | 0.4 | — | 34 | 62 | 9.6 | 36.5 | 48.5 |
| F | 0.6 | — | 40 | 66 | 10.0 | 39.3 | 49.0 |
| B | 0.5 | — | 26 | 56 | 6.9 | 34.0 | 48.8 |
| B | 1.0 | — | 35 | 61 | 6.6 | 36.0 | 48.0 |
| B | 1.5 | — | 43 | 65 | 6.3 | 34.0 | 46.8 |

The compositions of the invention are shown to be significantly more dose effective than the commercial polymeric naphthalene sulphonate in terms of plasticising efficiency.

1 day compressive strength is also demonstrated to be significantly improved over control and the polymeric naphthalene sulphonate (Admixture B).

Penetration resistance tests using the Procter Needle Apparatus according to ASTM No. C-403-80 were carried out in order to compare Admixtures D and F with the polymeric naphthalene sulphonate (Admixture B).

Mix Design

350 Kg/M$^{-3}$ OPC (Ordinary Portland Cement)
780 Kg/M$^{-3}$ Croxden Gravel
330 Kg/M$^{-3}$ Croxden Gravel
700 Kg/M$^{-3}$ Zone 3 Almington Pit Sand
   water/cement=0.60
   aggregate/cement=5.17
   % fines=38.7

Results are shown in Table IX.

TABLE IX

| Admixture Composition | Admixture Dose (% bwc) | Flow B (cm) | Extension of Set over Control (hrs) Initial Set (500 psi) | Final Set (4000 psi) |
|---|---|---|---|---|
| Nil | — | 35 | — | — |
| D | 0.2 | 55 | 0.5 | 0.2 |
| D | 0.4 | 58 | 1.1 | 1.3 |
| F | 0.2 | 57 | 0.8 | 0.9 |
| F | 0.4 | 62 | 2.0 | 2.3 |
| B | 0.5 | 56 | 1.5 | 1.6 |
| B | 1.0 | 60 | 2.2 | 2.7 |

Admixture D produces minimal extension of initial and final set at the lower dosage level.

At performance equivalent dosages Admixture D and F behave similarly, and show less set retardation than the polymeric naphthalene sulphonate, Admixture B.

To illustrate the preferred mole ratios of the ethylenically unsaturated acids and hydroxy ester copolymers a range of copolymers of acrylic acid and hydroxy propyl methacrylate have been evaluated.

These are shown below:

| Copolymer | | |
|---|---|---|
| Mole % AA | Mole % HPMA | Viscosity (cps) 15% solids in 1 M aqueous NaCl |
| 67 | 33 | 5.3 |
| 71.4 | 28.6 | 5.1 |

-continued

| Copolymer | | |
|---|---|---|
| Mole % AA | Mole % HPMA | Viscosity (cps) 15% solids in 1 M aqueous NaCl |
| 75 | 25 | 6.4 |
| 83.3 | 16.7 | 5.2 |

The copolymers were formulated into the following admixture compositions.

Composition G

30% w/w copolymer as Na salt
69.75% w/w water
0.25% w/w tri-n-butyl phosphate

To further demonstrate the effect of triethanolamine in admixture compositions of the invention the above compositions were formulated with triethanolamine.

Composition H

94% w/w copolymer composition as above
6% w/w triethanolamine

The compositions as described were evaluated in a concrete mix of the following design:

Mix Design

350 Kg/M$^{-3}$ OPC
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
water/cement = 0.60
aggregate/cement = 5.17
% fines = 38.7

The admixture compositions were evaluated using a dosage level of 0.4% bwc.
Results are shown in Table X.

Further, the addition of 6% triethanolamine to the AA/HPMA copolymers does not affect plasticising performance.

It is also shown that the monomer mole ratios significantly affect plasticising performance, 60-75 mole % AA being the preferred range.

Two admixture compositions of this invention were compared with a polymeric naphthalene sulphonate to affect water reduction whilst maintaining the same workability as a concrete mix without admixture.

The following mix design was used:

350 Kg/M$^{-3}$ OPC
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
aggregate/cement = 5.17
% fines = 38.7

Results are shown in Table XI.

TABLE XI

| Admixture Composition | Admixture Dose (% bwc) | Slump (mm) | w/c | % Water Reduction | Plastic Density (Kg/M$^{-3}$) | Compressive Strength (N/mm$^2$) | | |
|---|---|---|---|---|---|---|---|---|
| | | | | | | 1 Day | 7 Day | 28 Day |
| Nil | Nil | 55 | 0.56 | — | 2380 | 7.0 | 47.5 | 51.0 |
| D | 0.4 | 50 | 0.50 | 10.7 | 2380 | 11.3 | 55.5 | 59.5 |
| D | 0.6 | 60 | 0.49 | 12.5 | 2390 | 10.8 | 58.0 | 64.5 |
| F | 0.4 | 65 | 0.50 | 10.7 | 2390 | 11.5 | 55.5 | 66.6 |
| F | 0.6 | 55 | 0.49 | 12.5 | 2385 | 12.5 | 61.0 | 67.8 |
| B | 0.8 | 55 | 0.53 | 5.4 | 2390 | 10.0 | 49.5 | 57.0 |
| B | 1.5 | 55 | 0.49 | 12.5 | 2390 | 11.3 | 51.5 | 59.0 |

Admixtures of the invention are clearly shown to produce superior compressive strength development in water reduced concrete over that produced using the polymeric naphthalene sulphonate.

Penetration resistance rests were carried out using the Procter Needle Apparatus, according to ASTM No C-403-80, on the water reduced concretes described.
Results are shown in Table XII.

TABLE XII

| Admixture Composition | Admixture Dose (% bwc) | Initial Slump (mm) | % Water Reduction | Extension of Set over Control Concrete (hrs) | |
|---|---|---|---|---|---|
| | | | | Initial Set (500 psi) | Final Set (4000 psi) |
| D | 0.4 | 50 | 10.7 | 0.8 | 1.6 |
| D | 0.6 | 60 | 12.5 | 2.8 | 3.5 |
| F | 0.4 | 65 | 10.7 | 0.3 | 0.4 |
| F | 0.6 | 55 | 12.5 | 0.9 | 1.7 |
| B | 0.8 | 55 | 5.4 | Nil | 0.1 |
| B | 1.5 | 55 | 12.5 | 0.35 | 1.0 |

TABLE X

| Admixture Composition | Mole % AA | Mole % HPMA | Slump (mm) | Flow A (cm) | Flow B (cm) | Compressive Str % of Control | | |
|---|---|---|---|---|---|---|---|---|
| | | | | | | 1 Day | 7 Day | 28 Day |
| Nil | — | — | 60 | 20 | — | 100 | 100 | 100 |
| G | 67 | 33 | — | 32 | 56 | 85 | 97 | 98 |
| H | 67 | 33 | — | 33 | 57 | 113 | 102 | 102 |
| G | 71.4 | 28.6 | — | 30 | 56 | 86 | 100 | 97 |
| H | 71.4 | 28.6 | — | 31 | 56 | 110 | 110 | 107 |
| G | 75 | 25 | — | 28 | 53 | 79 | 93 | 100 |
| H | 75 | 25 | — | 28 | 53 | 105 | 111 | 104 |
| G | 83.3 | 16.7 | — | 24 | 50 | 77 | 101 | 100 |
| H | 83.3 | 16.7 | — | 25 | 50 | 108 | 112 | 108 |

These results show the beneficial effect of the addition of triethanolamine to these copolymers in that 1 day compressive strengths are significantly improved.

Admixture B

This polymeric naphthalene sulphonate is shown to produce minimal set retardation at the two dosage levels used (0.8, 1.5% bwc).

The two admixture compositions of this invention show some set retardation, which is dosage related. This property can offer substantial lengths where the workability of the concrete needs to be maintained for a period of time, yet not suffer from the disadvantage of retarded early rate of strength gain.

To demonstrate the effectiveness and show a preferred polymer type of the invention, three polymers were compared with a polymeric naphthalene sulphonate.

Admixture D 28.2% Acrylic acid/hydroxy propyl acrylate (Na salt 2.5/1 molar)
0.24% Tributyl phosphate
6.0 % Triethanolamine
65.56% Water

Admixture F 28.2% Acrylic acid/hydroxy propyl methacrylate (Na salt 2.5/1 molar)
0.24% Tributyl phosphate
6.0% Triethanolamine
65.56% Water

Admixture I 28.2% Acrylic acid/allyl alcohol (Na salt 2.5/1 molar)
0.24% Tributyl phosphate
6.0% Triethanolamine
65.56% Water Results are shown in Table XIII using the following mix design:

350 Kg/M$^{-3}$ OPC
780 Kg/M$^{-3}$ 20 mm Croxden Gravel
330 Kg/M$^{-3}$ 10 mm Croxden Gravel
700 Kg/M$^{-3}$ Zone 3 Almington Pit Sand
water/cement = 0.60

TABLE XIII

| Admixture Composition | Admixture Dose (% bwc) | Slump (mm) | Flow A | Flow B | Compressive Strength (N/mm$^2$) 1 Day | 7 Day | 28 Day |
|---|---|---|---|---|---|---|---|
| Nil | Nil | 80 | 23 | — | 8.3 | 35.8 | 46.5 |
| D | 0.4 | — | 34 | 56 | 8.9 | 38.0 | 48.5 |
| F | 0.4 | — | 34 | 59 | 9.1 | 39.4 | 49.8 |
| I | 0.4 | — | 31 | 54 | 7.8 | 41.2 | 49.5 |
| B | 1.0 | — | 34 | 56 | 6.6 | 36.5 | 47.5 |

These results show Admixture F produces the best results in terms of workability and 1 day compressive strength development.

The preferred composition of the invention—Admixture F—was compared in detail with a commercial polymeric naphthalene sulphonate—Admixture B—in a range of applicational situations.

1. OPC Concrete

1.1 Flowing concrete

Admixtures F and B were compared in three mix designs to determine the effect on workability and strength development.

Results are shown in Table XIV.

| | Kg M$^{-3}$ | | |
|---|---|---|---|
| OPC | 200 | 350 | 400 |
| 20 mm Croxden Gravel | 860 | 780 | 750 |
| 10 mm Croxden Gravel | 360 | 330 | 320 |
| Zone 3 Almington Pit Sand | 780 | 700 | 630 |

TABLE XIV

| Admixture | Admixture Dose % bwc | Kg M$^{-3}$ OPC | w/c | Slump (mm) | Flow (cms) | Compressive Strength N/mm$^2$ 1 day | 7 day | 28 day |
|---|---|---|---|---|---|---|---|---|
| Nil | Nil | 200 | 1.15 | 45 | — | 2.9 | 9.9 | 12.0 |
| F | 0.4 | 200 | 1.15 | — | 63 | 2.5 | 9.6 | 12.5 |
| B | 1.0 | 200 | 1.15 | — | 61 | 2.4 | 9.9 | 11.5 |
| Nil | Nil | 350 | 0.60 | 75 | — | 7.8 | 32.8 | 46.3 |
| F | 0.2 | 350 | 0.60 | — | 59 | 8.8 | 32.5 | 47.0 |
| F | 0.4 | 350 | 0.60 | — | 62 | 9.6 | 36.5 | 48.5 |
| F | 0.6 | 350 | 0.60 | — | 66 | 10.0 | 39.3 | 49.0 |
| B | 0.5 | 350 | 0.60 | — | 56 | 6.9 | 34.0 | 48.8 |
| B | 1.0 | 350 | 0.60 | — | 61 | 6.6 | 36.0 | 48.0 |
| B | 1.5 | 350 | 0.60 | — | 65 | 6.3 | 34.0 | 46.8 |
| Nil | Nil | 400 | 0.50 | 70 | — | 17.7 | 42.0 | 47.0 |
| F | 0.4 | 400 | 0.50 | — | 64 | 19.2 | 43.0 | 49.0 |
| B | 1.0 | 400 | 0.50 | — | 64 | 20.4 | 39.5 | 46.8 |

These results show Admixture F to perform as an efficient superplasticiser over a range of cement contents at much lower dosages than Admixture B.

1.2 To produce high range water reductions

Admixture F was compared with Admixture B and a commercial calcium lignosulphonate (Admixture J) at three cement contents, using the mix designs shown in 1.1. Results are shown in Table XV.

Admixture J

40% Calcium lignosulphonate
0.3% TBP
54.7% Water

TABLE XV

| Admixture | Admixture Dose % bwc | Kg M$^{-3}$ OPC | w/c | Plastic Density Kg M$^{-3}$ | Slump (mm) | Compressive Strength N/mm$^2$ 1 day | 7 day | 28 day |
|---|---|---|---|---|---|---|---|---|
| Nil | Nil | 200 | 1.15 | 2240 | 45 | 2.9 | 9.9 | 12.0 |
| F | 0.2 | 200 | 1.03 | 2260 | 50 | 3.8 | 12.3 | 16.3 |
| F | 0.4 | 200 | 0.97 | 2270 | 40 | 4.1 | 14.3 | 18.5 |
| B | 1.0 | 200 | 1.02 | 2270 | 40 | 4.1 | 13.5 | 16.0 |
| J | 0.4 | 200 | 1.05 | 2270 | 50 | 3.1 | 11.0 | 14.8 |
| Nil | Nil | 350 | 0.56 | 2280 | 55 | 7.0 | 47.5 | 51.0 |
| F | 0.4 | 350 | 0.50 | 2290 | 65 | 11.5 | 55.5 | 66.6 |
| F | 0.6 | 350 | 0.49 | 2290 | 55 | 12.5 | 61.0 | 67.8 |
| B | 1.0 | 350 | 0.53 | 2290 | 55 | 10.0 | 49.5 | 59.0 |
| Nil | Nil | 400 | 0.50 | 2260 | 70 | 17.7 | 42.0 | 47.0 |
| F | 0.2 | 400 | 0.43 | 2290 | 65 | 25.8 | 49.0 | 56.2 |
| F | 0.4 | 400 | 0.42 | 2290 | 80 | 30.1 | 52.5 | 64.0 |
| B | 1.0 | 400 | 0.43 | 2290 | 80 | 30.2 | 50.3 | 60.7 |
| J | 0.4 | 400 | 0.44 | 2290 | 60 | 26.0 | 48.3 | 53.3 |

Significant improvements in compressive strengths are shown using Admixture F as a high range water reducing agent.

2. SRC Concrete

2.1 To produce flowing concrete

Admixtures F and B were used to produce flowing concrete in the following concrete mixes.

| Mix Designs | | | |
|---|---|---|---|
| | Kg M$^{-3}$ | | |
| SRC | 200 | 300 | 400 |
| 20 mm Croxden Gravel | 860 | 820 | 750 |
| 10 mm Croxden Gravel | 360 | 340 | 320 |
| Zone 3 Almington Pit Sand | 780 | 680 | 630 |

Results are shown in Table XVI.

TABLE XVI

| Ad-mixture | Admixture Dose % bwc | SRC Kg M$^{-3}$ | w/c | Slump (mm) | Flow (cms) | Compressive Strength N/mm$^2$ | | |
|---|---|---|---|---|---|---|---|---|
| | | | | | | 1 day | 7 day | 28 day |
| Nil | Nil | 200 | 1.08 | 60 | — | 3.4 | 9.7 | 13.0 |
| F | 0.2 | 200 | 1.08 | — | 55 | 4.1 | 9.5 | 13.3 |
| F | 0.4 | 200 | 1.08 | — | 59 | 4.0 | 10.5 | 15.0 |
| F | 0.6 | 200 | 1.08 | — | >70* | 2.4* | 7.3* | 10.8* |
| B | 0.5 | 200 | 1.08 | — | 49 | 3.6 | 9.7 | 13.5 |
| B | 1.0 | 200 | 1.08 | — | 57 | 3.9 | 8.7 | 13.0 |
| B | 1.5 | 200 | 1.08 | — | 62 | 3.4 | 9.5 | 12.3 |
| Nil | Nil | 300 | 0.67 | 70 | — | 12.8 | 26.3 | 33.6 |
| F | 0.2 | 300 | 0.67 | — | 58 | 11.7 | 26.5 | 32.4 |
| F | 0.4 | 300 | 0.67 | — | 61 | 12.2 | 27.3 | 35.2 |
| F | 0.6 | 300 | 0.67 | — | 67 | 12.3 | 29.5 | 35.5 |
| B | 0.5 | 300 | 0.67 | — | 53 | 12.6 | 26.1 | 32.8 |
| B | 1.0 | 300 | 0.67 | — | 62 | 11.9 | 25.5 | 32.8 |
| B | 1.5 | 300 | 0.67 | — | 69 | 10.7 | 25.0 | 30.3 |
| Nil | Nil | 400 | 0.49 | 70 | — | 25.3 | 42.0 | 50.6 |
| F | 0.2 | 400 | 0.49 | — | 54 | 27.0 | 40.8 | 47.5 |
| F | 0.4 | 400 | 0.49 | — | 59 | 25.5 | 41.3 | 48.7 |
| F | 0.6 | 400 | 0.49 | — | 72 | 24.3 | 43.8 | 51.5 |
| B | 0.5 | 400 | 0.49 | — | 56 | 26.3 | 42.5 | 45.0 |
| B | 1.0 | 400 | 0.49 | 70 | 68 | 23.0 | 41.0 | 45.4 |
| B | 1.5 | 400 | 0.49 | — | 72 | 23.5 | 41.0 | 47.1 |

*Mix segregated

Admixture F is shown to function very effectively in comparison with B, in terms of dose effectiveness and development of early compressive strength.

2.2 To produce high range water reduction

Admixtures F and B were compared as water reducing agents in 300 and 400 Kg M$^{-3}$ SRC mix designs. Results are shown in Table XVII.

TABLE XVII

| Ad-mixture | Admixture Dose % bwc | SRC Kg M$^{-3}$ (adjusted) | w/c | Plastic Density Kg M$^{-3}$ | Slump (mm) | Compressive Strength N/mm$^2$ | | |
|---|---|---|---|---|---|---|---|---|
| | | | | | | 1 day | 7 day | 28 day |
| Nil | Nil | 287 | 0.68 | 2260 | 65 | 13.3 | 28.3 | 32.5 |
| F | 0.2 | 292 | 0.59 | 2275 | 60 | 18.3 | 33.0 | 39.0 |
| F | 0.4 | 295 | 0.55 | 2290 | 60 | 20.0 | 36.0 | 44.6 |
| F | 0.6 | 299 | 0.51 | 2305 | 60 | 25.3 | 46.0 | 51.0 |
| B | 0.5 | 292 | 0.60 | 2275 | 60 | 17.0 | 34.5 | 40.5 |
| B | 1.0 | 296 | 0.56 | 2300 | 65 | 17.0 | 38.5 | 45.3 |
| B | 1.5 | 299 | 0.51 | 2305 | 65 | 20.5 | 41.5 | 47.2 |
| Nil | Nil | 401 | 0.49 | 2300 | 60 | 26.0 | 44.9 | 53.0 |
| F | 0.2 | 409 | 0.43 | 2320 | 65 | 30.5 | 47.0 | 54.0 |
| F | 0.4 | 411 | 0.40 | 2320 | 65 | 33.8 | 49.0 | 55.5 |
| F | 0.6 | 416 | 0.37 | 2340 | 60 | 35.8 | 54.3 | 60.0 |
| B | 0.5 | 407 | 0.43 | 2310 | 65 | 33.0 | 49.5 | 57.0 |
| B | 1.0 | 409 | 0.40 | 2320 | 60 | 36.0 | 51.6 | 56.0 |
| B | 1.5 | 416 | 0.37 | 2340 | 65 | 42.5 | 59.8 | 63.0 |

Admixture F in the 300 Kg M$^{-3}$ SRC mix design performs significantly better at much lower dosage levels than "B" particularly in terms of 1 day compressive strength.

3. Pfa/OPC Concretes

3.1 To produce flowing concrete

Mix designs based on a 30% replacement of Pfa for OPC were used to compare Admixtures F and B. Three cement contents 200, 300, 400 Kg M$^{-3}$ were evaluated.

| Mix Designs | | | | | | |
|---|---|---|---|---|---|---|
| | Kg M$^{-3}$ | | | | | |
| OPC | 200 | 151 | 300 | 227 | 400 | 302 |
| Pfa | — | 65 | — | 97 | — | 130 |
| 20 mm Croxden Gravel | 820 | 820 | 820 | 820 | 820 | 820 |
| 10 mm Croxden Gravel | 410 | 410 | 410 | 410 | 410 | 410 |
| Zone 3 Almington Pit Sand | 745 | 745 | 655 | 655 | 565 | 565 |

Results are shown in Table XVIII.

TABLE XVIII

| OPC/Pfa Kg M$^{-3}$ | Ad-mixture | Admixture Dose % bwc | w/c | Slump (mm) | Flow (cm) | Compressive Strength N/mm$^2$ | | |
|---|---|---|---|---|---|---|---|---|
| | | | | | | 1 day | 7 day | 28 day |
| 200/Nil | — | — | 1.1 | 50 | — | 2.6 | 11.8 | 14.3 |
| 151/65 | — | — | 0.95 | 50 | — | 1.6 | 9.0 | 13.5 |
| 151/65 | F | 0.4 | 0.95 | — | 61 | 1.3 | 8.3 | 11.8 |
| 151/65 | B | 1.0 | 0.95 | — | 56 | 1.3 | 8.2 | 11.5 |
| 300/Nil | — | — | 0.70 | 50 | — | 9.4 | 27.1 | 31.5 |
| 227/97 | — | — | 0.62 | 60 | — | 6.4 | 19.7 | 30.5 |
| 227/97 | F | 0.4 | 0.62 | — | 67 | 5.7 | 18.8 | 30.3 |
| 227/97 | B | 1.0 | 0.62 | — | 66 | 5.5 | 18.5 | 28.0 |
| 400/Nil | — | — | 0.51 | 50 | — | 16.8 | 44.0 | 46.0 |
| 302/130 | — | — | 0.44 | 45 | — | 13.0 | 37.5 | 52.0 |
| 302/130 | F | 0.4 | 0.44 | — | 54 | 11.8 | 33.0 | 51.5 |
| 302/130 | B | 1.0 | 0.44 | — | 55 | 9.8 | 35.0 | 47.3 |

Both Admixtures F and B show slight retardation of 1 day compressive strength compared with the OPC/Pfa control mix. At 28 days both the OPC/Pfa control, and superplasticised OPC/Pfa mixes attained the OPC control mix compressive strengths over the range of cement contents.

3.2 To produce high range water reductions

Using mix designs as shown in 3.1 Admixtures F and B were used to effect high range water reductions. Results are shown in Table XIX.

TABLE XIX

| OPC/Pfa Kg M$^{-3}$ | Admix | Admixture Dose % bwc | w/c | Slump (mm) | Compressive Strength N/mm$^2$ 1 day | 7 day | 28 day |
| --- | --- | --- | --- | --- | --- | --- | --- |
| 200/Nil | — | — | 1.1 | 50 | 2.6 | 11.8 | 14.3 |
| 151/65 | — | — | 0.95 | 50 | 1.6 | 9.0 | 13.5 |
| 151/65 | F | 0.4 | 0.83 | 45 | 2.5 | 12.5 | 19.8 |
| 151/65 | B | 1.0 | 0.84 | 45 | 2.2 | 10.3 | 16.3 |
| 300/Nil | — | — | 0.70 | 50 | 9.4 | 27.1 | 31.5 |
| 227/97 | — | — | 0.62 | 60 | 6.4 | 19.7 | 30.5 |
| 227/97 | F | 0.4 | 0.51 | 50 | 9.8 | 29.8 | 42.3 |
| 400/Nil | — | — | 0.51 | 50 | 16.8 | 44.0 | 46.0 |
| 302/130 | — | — | 0.44 | 45 | 13.0 | 37.5 | 52.0 |
| 302/130 | F | 0.4 | 0.38 | 50 | 16.5 | 47.0 | 58.0 |

1 day compressive strengths are shown to match those of the OPC control mixes and to be superior to those of the OPC/Pfa mixes at 28 days the water reduced mixes are shown to give significantly improved compressive strengths over those of the control mixes.

4. Early Strength Development in OPC Water Reduced Concretes

Admixture F was compared with the commercial naphthalene sulphonate (Admixture B) and with Admixture K—a commercial accelerating admixture based on naphthalene sulphonate—in water reduced concrete to determine compressive strength at early ages.

Results are shown in Table XX—a standard 300 Kg M$^{-3}$ OPC mix design was used.

TABLE XX

| Admixture | Admixture Dose % bwc | w/c | Slump (mm) | Compressive Strength N/mm$^2$ 6 hr | 7 hr | 12 hr | 23 hr | 30 hr | 72 hr | 28 day |
| --- | --- | --- | --- | --- | --- | --- | --- | --- | --- | --- |
| Nil | Nil | 0.59 | 60 | 1.2 | 2.0 | 7.9 | 14.8 | 17.0 | 27.4 | 43.0 |
| F | 0.4 | 0.48 | 60 | 0.9 | 2.2 | 13.5 | 25.5 | 30.0 | 41.1 | 52.0 |
| F | 0.8 | 0.45 | 70 | — | — | 13.9 | 31.0 | 37.0 | 44.0 | 61.5 |
| B | 1.0 | 0.49 | 60 | 2.0 | 3.2 | 12.7 | 22.3 | 27.6 | 40.0 | 53.0 |
| B | 2.0 | 0.45 | 60 | — | — | 13.9 | 29.0 | 33.8 | 40.8 | 57.0 |
| K | 2.0 | 0.45 | 60 | 0.8 | 2.3 | 14.1 | 29.0 | 34.5 | 44.0 | 48.0 |

These results show Admixture B to be more efficient in terms of compressive strength development during the very early ages of hydration (up to 7 hours). At later ages (eg 10 hours) Admixture F is as efficient as B and thereafter shows superior compressive strength development over the conventional polymeric naphthalene sulphonates.

5. Workability Extension Properties

Admixtures F and B were evaluated in both SRC and OPC concrete mix designs to determine their effect on extension of workability.

A standard 300 Kg M$^{-3}$ cement content mix design was used in both sets of tests.

The results are shown in Tables XXI and XXII.

TABLE XXI

| Admixture | Dose % bwc | Cement Type | w/c | Initial Slump/Flow | Compressive Strength N/mm$^2$ 1 day | 7 day | 28 day |
| --- | --- | --- | --- | --- | --- | --- | --- |
| Nil | — | OPC | 0.72 | 75 slump | 7.9 | 26.3 | 33.0 |
| F | 0.6 | OPC | 0.72 | 62 flow | 7.7 | 25.0 | 32.5 |
| B | 1.5 | OPC | 0.72 | 60 flow | 5.9 | 24.0 | 30.8 |
| Nil | — | SRC | 0.68 | 80 slump | 7.8 | 21.0 | 31.0 |
| F | 0.6 | SRC | 0.68 | 68 flow | 8.1 | 22.3 | 32.8 |
| B | 1.5 | SRC | 0.68 | 66 flow | 8.5 | 23.0 | 32.0 |

TABLE XXII

| | CEMENT: OPC | | | SRC | | |
| --- | --- | --- | --- | --- | --- | --- |
| TIME (HRS): | Nil | 0.6% Admix F | 1.5% Admix B | Nil | 0.6% Admix F | 1.5% Admix B |
| 0 | 75 slump | Flowing | Flowing | 80 slump | Flowing | Flowing |
| 1 | 50 slump | Flowing | Flowing | 70 slump | 140 | 150 |
| 2 | 30 slump | 160 slump | 140 slump | 60 slump | 130 | 85 |
| 3 | — | 125 slump | 90 slump | 40 slump | 130 | 50 |
| 4 | — | 115 slump | 30 slump | — | 125 | 25 |
| 5 | — | 65 slump | — | — | 70 | — |
| 6 | — | 40 slump | — | — | 40 | — |

Slump measurements in mm.

From these results it can be seen that Admixture F at 0.6% bwc gives much better workability extension than Admixture B at 1.5% bwc both in OPC and SRC. The point to note in its effect with SRC is that the workability remains constant for a long period (2–3 hours) before eventually stiffening.

We claim:

1. A plasticiser additive composition comprising an aqueous solution of a copolymer or a soluble salt thereof, comprising an ethylenically polymerisable carboxylic acid and an ethylenically unsaturated monomer having a hydroxyl functional group, which monomer is copolymerisable with said acid, the copolymer having a molecular weight in the range 1000 to 15000 and from 10 to 90% by weight of the copolymer of an accelerator additive selected from triethanolamine or salts thereof and water soluble thiocyanates, said accelerator additive functioning with the copolymer to provide early strength gain when said composition is used to plasticize a cementiferous composition.

2. A plasticiser additive composition as claimed in claim 1 in which the copolymer comprises 50 to 95 mole % of the acid and 5 to 50 mole % of the monomer, which monomer is a hydroxy ester.

3. A plasticiser additive composition as claimed in claim 1 in which the monomer comprises an alkenyl alcohol.

4. A plasticiser additive composition as claimed in claim 1 in which the monomer comprises a hydroxy alkyl acrylamide.

5. A plasticiser additive as claimed in claim 1 in which the weight of accelerator is 15 to 35% by weight of the copolymer.

6. A cementiferous composition comprising a plasticiser additive as claimed in claim 1, said composition being characterized by its early strength gain.

* * * * *

UNITED STATES PATENT AND TRADEMARK OFFICE
CERTIFICATE OF CORRECTION

PATENT NO. : 4,524,163
DATED : June 18, 1985
INVENTOR(S) : Bradley et al

It is certified that error appears in the above—identified patent and that said Letters Patent is hereby corrected as shown below:

On the title page assignee should read

--(73) Assignee: Internationale Octrooi Maatschappij

"Octropa" B.V., Rotterdam, The Netherlands.--

Signed and Sealed this

Second Day of September 1986

[SEAL]

Attest:

DONALD J. QUIGG

Attesting Officer

Commissioner of Patents and Trademarks